(12) United States Patent
Solbrig et al.

(10) Patent No.: US 8,959,900 B2
(45) Date of Patent: Feb. 24, 2015

(54) EXHAUST AFTERTREATMENT SYSTEM FOR INTERNAL COMBUSTION ENGINE

(71) Applicant: GM Global Technology Operations LLC, Detroit, MI (US)

(72) Inventors: Charles E. Solbrig, Ypsilanti, MI (US); Ognyan N. Yanakiev, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 42 days.

(21) Appl. No.: 13/849,091

(22) Filed: Mar. 22, 2013

(65) Prior Publication Data

US 2013/0247545 A1 Sep. 26, 2013

Related U.S. Application Data

(60) Provisional application No. 61/615,531, filed on Mar. 26, 2012.

(51) Int. Cl.
| | |
|---|---|
| *F01N 3/00* | (2006.01) |
| *F01N 3/025* | (2006.01) |
| *F01N 3/20* | (2006.01) |
| *B01F 5/04* | (2006.01) |
| *B01F 5/06* | (2006.01) |
| *B01F 3/04* | (2006.01) |
| *F01N 3/10* | (2006.01) |
| *F01N 3/28* | (2006.01) |
| *F01N 13/08* | (2010.01) |
| *F01N 13/00* | (2010.01) |
| *B01F 5/00* | (2006.01) |

(52) U.S. Cl.
CPC ............ *F01N 3/0253* (2013.01); *F01N 3/208* (2013.01); *B01F 5/0451* (2013.01); *B01F 5/0652* (2013.01); *B01F 3/04049* (2013.01); *F01N 3/106* (2013.01); *F01N 3/2066* (2013.01); *F01N 3/2093* (2013.01); *F01N 3/2892* (2013.01); *F01N 13/08* (2013.01); *F01N 13/009* (2014.06); *B01F 2005/0022* (2013.01); *F01N 2470/20* (2013.01); *F01N 2470/30* (2013.01); *Y02T 10/24* (2013.01)
USPC .................... 60/295; 60/286; 60/301; 60/303

(58) Field of Classification Search
USPC ........................... 60/274, 286, 295, 301, 303
See application file for complete search history.

(56) References Cited

U.S. PATENT DOCUMENTS

| | | | | |
|---|---|---|---|---|
| 6,293,097 | B1 * | 9/2001 | Wu et al. ........................ | 60/286 |
| 6,620,391 | B2 * | 9/2003 | Muller et al. .................. | 423/210 |
| 7,152,396 | B2 * | 12/2006 | Cheng ............................ | 60/286 |
| 8,336,302 | B2 * | 12/2012 | Nakahira ........................ | 60/303 |
| 8,561,396 | B2 * | 10/2013 | Nagaoka et al. ................ | 60/320 |
| 8,596,044 | B2 * | 12/2013 | Werni et al. .................... | 60/286 |
| 2003/0221424 | A1 * | 12/2003 | Woerner et al. ................ | 60/297 |

* cited by examiner

*Primary Examiner* — Binh Q Tran
(74) *Attorney, Agent, or Firm* — Cantor Colburn LLP

(57) ABSTRACT

A mixing plenum for exhaust gas comprises a canister with an inlet and an outlet. A bulkhead is located downstream from the inlet to define an exhaust gas consolidation chamber. An opening in the bulkhead allows exhaust gas to enter a u-shape conduit configured to direct the exhaust gas from a downstream direction to an upstream direction before releasing the exhaust gas back into the plenum downstream of the bulkhead. An injector is configured to inject fluid into the exhaust gas entering the conduit. A conduit exit located a distance "E" from the downstream side of the bulkhead allows the exhaust gas/fluid mixture to exit the conduit into a larger exit volume of the compact mixing can, in the manner of an expansion chamber, where its velocity slows and further mixing of the fluid/exhaust gas occurs and exits the compact mixing can through the outlet flange.

14 Claims, 6 Drawing Sheets

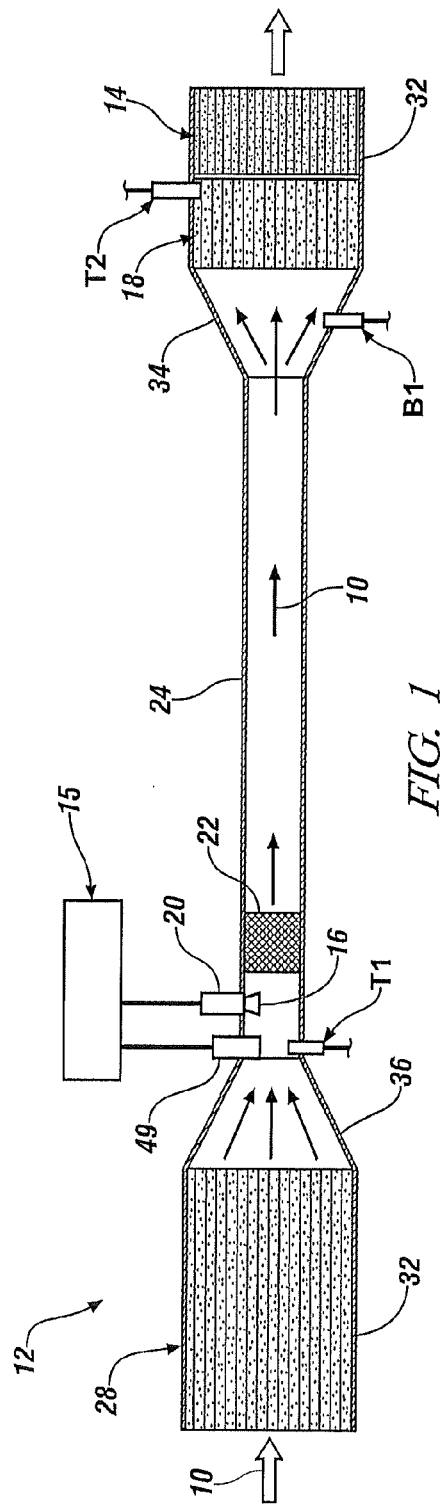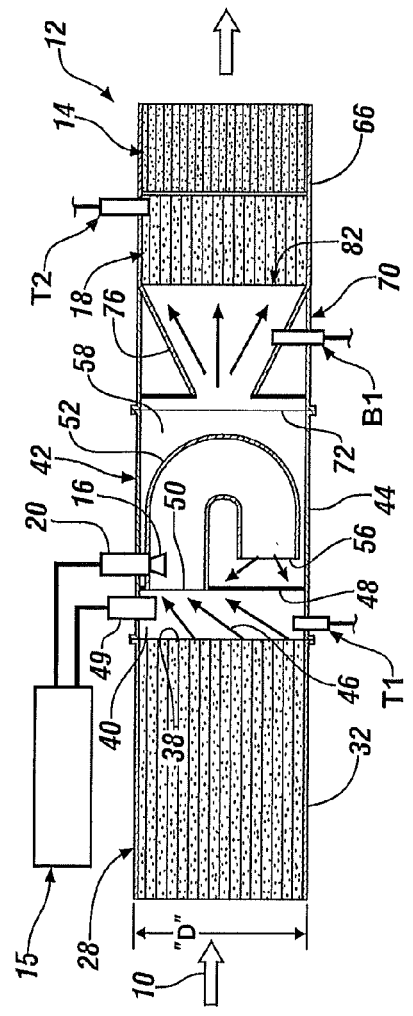

EXHAUST AFTERTREATMENT SYSTEM FOR INTERNAL COMBUSTION ENGINE

CROSS-REFERENCES TO RELATED APPLICATIONS

This patent application claims priority to U.S. Provisional Patent Application Ser. No. 61/615,531 filed Mar. 26, 2012, which is incorporated herein by reference in its entirety.

FIELD OF THE INVENTION

Exemplary embodiments of the invention relate to exhaust treatment systems for internal combustion engines and, more particularly, to exhaust treatment systems capable of fully mixing and vaporizing injected fluids into the exhaust gas flow in a minimal physical or packagable length.

BACKGROUND

Referring to FIG. 1, the exhaust gas 10 emitted to an exhaust treatment system 12 from an internal combustion engine (not shown) is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter. Catalyst compositions typically disposed on catalyst supports or substrates are provided in various exhaust system devices to convert certain, or all of these exhaust constituents into non-regulated exhaust gas components.

An exhaust treatment technology, in use for high levels of particulate matter reduction, particularly in diesel engines, is the Particulate Filter ("PF") device 14. There are several known filter structures used in PF devices that have displayed effectiveness in removing the particulate matter from the exhaust gas 10 such as ceramic honeycomb wall flow filters, wound or packed fiber filters, open cell foams, sintered metal fibers, etc. Ceramic wall flow filters have experienced significant acceptance in automotive applications.

The filter in a PF device 14 is a physical structure for removing particulates from exhaust gas 10 and, as a result, the accumulation of filtered particulates will have the effect of increasing the exhaust system backpressure experienced by the engine. To address backpressure increases caused by the accumulation of exhaust gas particulates, the PF device 14 is periodically cleaned, or regenerated. The regeneration operation burns off the carbon and particulate matter collected in the filter substrate and regenerates the PF device 14.

Regeneration of a PF device 14 in vehicle applications is typically automatic and is controlled by an engine or other controller 15 based on signals generated by engine and exhaust system sensors such as Temperature sensors T1, T2 and back pressure sensors B1. The regeneration event involves increasing the temperature of the PF device 14 to levels that are often above 600 C in order to burn the accumulated particulates.

One method of generating the temperatures required in the exhaust system for regeneration of the PF device 14 is to deliver unburned HC (often in the form of raw fuel) 16 to an oxidation catalyst ("OC") device 18 disposed upstream of the PF device. The HC 16 may be delivered by injecting fuel (either as a liquid or pre-vaporized) directly into the exhaust gas 10 using an HC injector/vaporizer 20. The HC 16 is oxidized in the OC device 18 resulting in an exothermic reaction that raises the temperature of the exhaust gas 10. The heated exhaust gas travels downstream to the PF device 14 to thereby burn (oxidize) the particulate accumulation. A challenge for designers, especially those involved in space limited automotive engineering, is that injecting fluids such as HC 16 into the exhaust gas 10 upstream of the OC device 18, or any other device for that matter, must allow for sufficient residence time, turbulence and distance in the exhaust flow 10 for the injected fluid to become sufficiently mixed and vaporized prior to entering the device. Without proper preparation, the injected fluid, HC 16 for instance, will not properly oxidize in the OC device 14 and some unburned HC may pass through the device resulting in wasted fuel passing through the exhaust treatment system 12 and local hot and cool spots within devices 14 and 18. Turbulators (Static Mixers) or other mixing devices 22 may be installed in an exhaust conduit 24 that fluidly connects the various exhaust treatment devices to aide in mixing the injected fluid. Such mixing devices, while effective, may add undesirable backpressure to the exhaust treatment system 12, reducing engine performance.

A technology that has been developed to reduce the levels of $NO_x$ emissions in lean-burn engines (ex. diesel engines) that burn fuel in excess oxygen includes a selective catalytic reduction ("SCR") device 28. The SCR catalyst composition disposed in the SCR device preferably contains a zeolite and one or more base metal components such as iron ("Fe"), cobalt ("Co"), copper ("Cu") or vanadium ("V") which can operate efficiently to reduce $NO_x$ constituents in the exhaust gas 10 in the presence of a reductant (not shown) such as ammonia ('$NH_3$'). The reductant is typically delivered upstream of the SCR device, in a manner similar to the HC discussed above, and travels downstream to the SCR device 28 to interact with the SCR catalyst composition; reducing the levels of $NO_x$ in the exhaust gas passing through the SCR device. Like the HC discussed above, without proper mixing, the injected reductant, urea or ammonia for instance, will not properly function in the SCR device and some of the fluid may pass through the device resulting in wasted reductant as well as reduced $NO_x$ conversion efficiency.

With continuing reference to FIG. 1, typical exhaust treatment systems 12 may include several exhaust treatment devices as described above. In many instances, whether historical or not, the devices may comprise individual components that are serially disposed along the exhaust conduit 24 that extends from the exhaust manifold outlet of the internal combustion engine (not shown) to the tailpipe outlet (not shown) of the exhaust treatment system 12. The individual components typically comprise catalyst coated substrates that are encased in ridged canisters 32 constructed of stainless steel, to resist corrosion and extend operational life. The canisters 32 each have an inlet and an outlet at either end to permit the flow of exhaust gas therethrough. The canisters typically have of inlet and outlet cones 34, 36 respectively, placed at either end which are configured to allow the exhaust gas 10 that is entering a device to transition smoothly from a relatively small diameter exhaust conduit 24 into a larger diameter exhaust treatment device which has been sized based on the maximum engine exhaust flow rate and the quantity of exhaust catalyst volume deemed necessary to adequately treat the specific exhaust component ("CO", "HC", NOx, etc.). A problem with this configuration is that it is necessary to choose a reasonable length between components, as well as sufficient mixing devices 22 disposed within the exhaust conduit, to achieve adequate mixing of injected fluids (ex. HC and Urea (ammonia) reductant). On the other hand, as vehicle architectures become smaller, the desired length for the exhaust treatment system 12 discussed above is not necessarily available.

Accordingly it is desirable to provide an apparatus that will achieve uniform mixing and distribution of a fluid injected into the exhaust gas 10 in an exhaust treatment system 12 in a compact distance.

SUMMARY

In an exemplary embodiment, an exhaust gas treatment system having a compact mixing plenum configured to receive an exhaust gas/fluid mixture comprises a canister having an upstream inlet and a bulkhead disposed within the canister at a distance downstream of the upstream inlet to thereby define an exhaust gas consolidation chamber therebetween. An exhaust gas opening is disposed in the bulkhead, through which exhaust gas passing through the exhaust gas consolidation chamber enters a high pressure, high velocity mixing conduit. The mixing conduit comprises a substantially U-shaped conduit configured to direct the fluid/exhaust gas mixture from a downstream to an upstream direction within the compact mixing plenum for through mixing of the fluid/exhaust gas mixture, a high pressure, high velocity mixing conduit exit located adjacent a downstream side of the bulkhead, and a low pressure, low velocity exit volume defined by the rigid canister downstream of the bulkhead and configured to receive the fluid/exhaust gas mixture from the high pressure, high velocity mixing conduit exit for further mixing of the fluid/exhaust gas mixture, wherein actual exhaust flow distance is realized over line-of-sight flow distance.

The above features and advantages and other features and advantages of the invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIG. 1 is a schematic view of a typical automotive exhaust treatment system;

FIG. 2 is a schematic view of an automotive exhaust treatment system embodying features of the invention;

DESCRIPTION OF THE EMBODIMENTS

Figure 3:
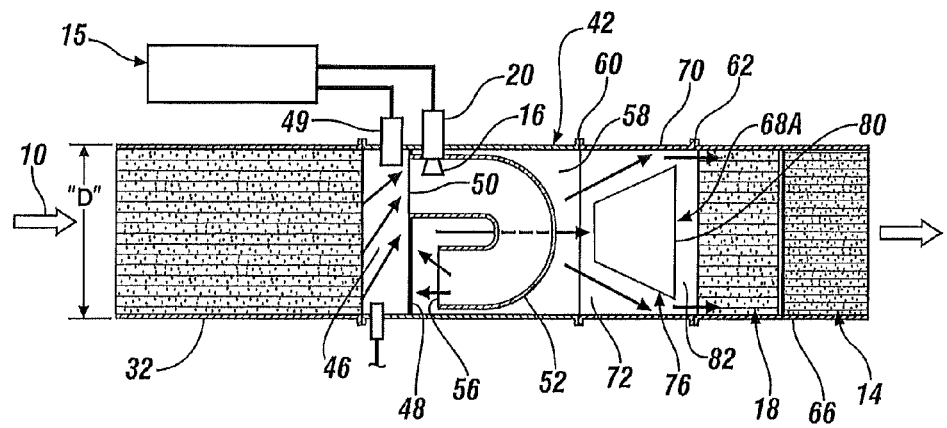
FIG. 3 is a schematic view of another embodiment of an automotive exhaust treatment system embodying features of the invention.

The following description is merely exemplary in nature and is not intended to limit the present disclosure, its application or uses. It should be understood that throughout the drawings, including FIG. 1, corresponding reference numerals indicate like or corresponding parts and features.

Figure 4:
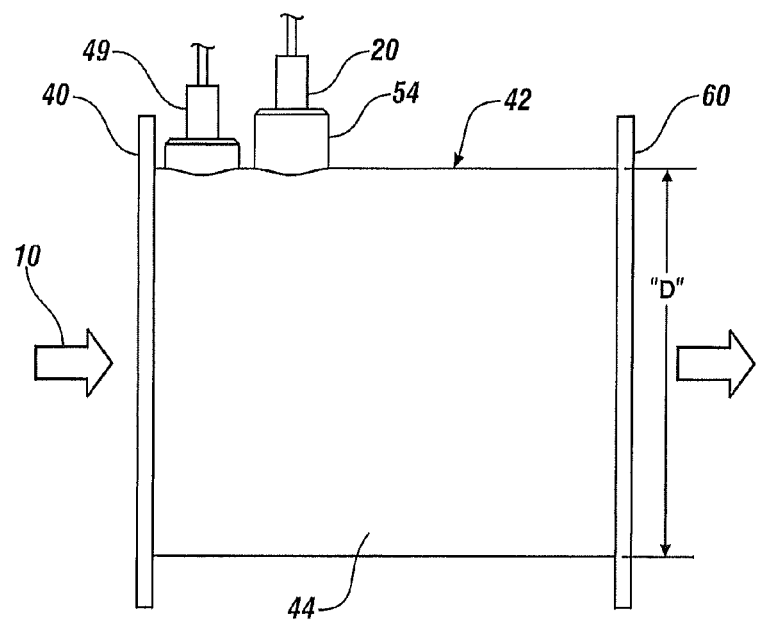
FIG. 4 is an external view of the compact mixing plenum embodying features of the present invention.
Figure 4A:
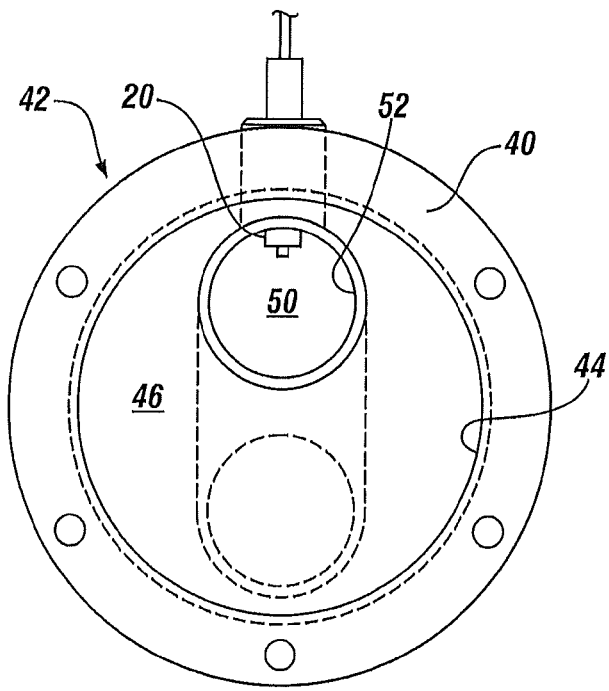
FIG. 4A is an inlet view of the compact mixing plenum embodying features of the present invention.
Figure 4B:
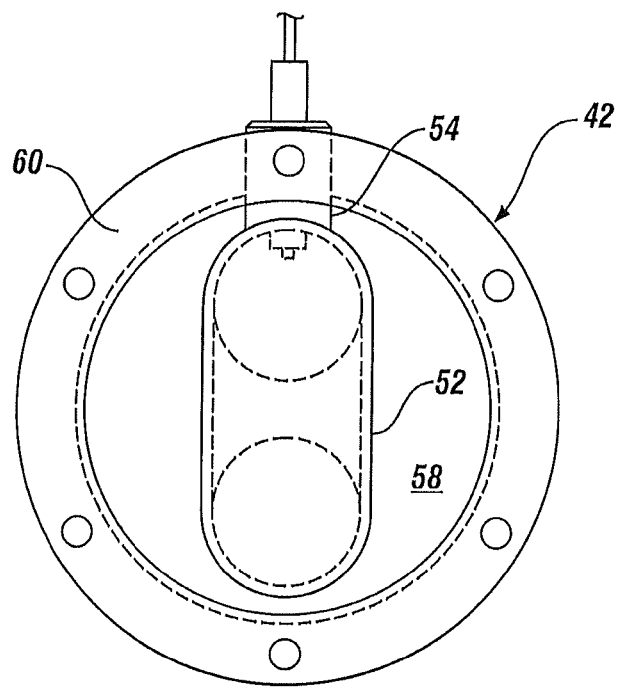
FIG. 4B is an outlet end of the compact mixing plenum embodying features of the present invention.
Figure 5:
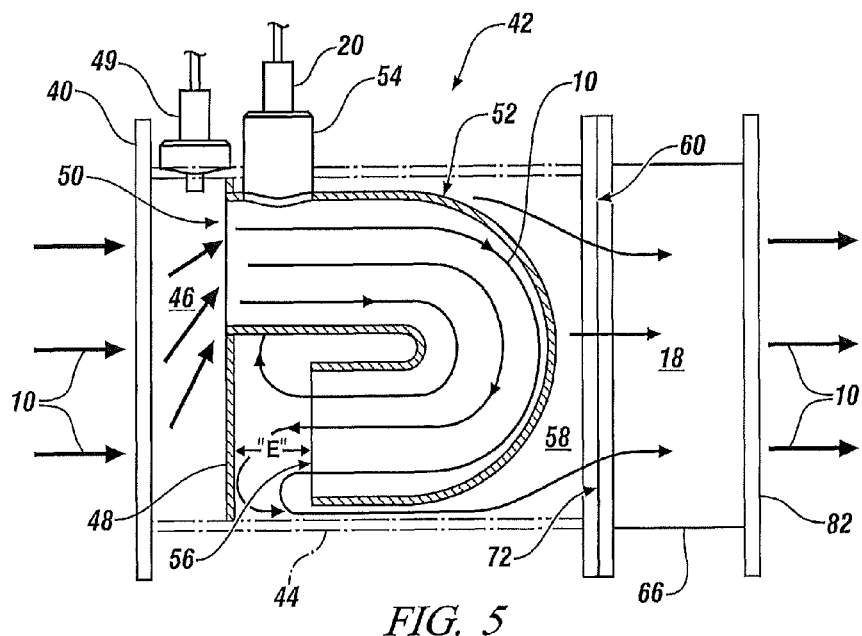
FIG. 5 is a partially disassembled view of the compact mixing plenum embodying features of the invention.

Referring to FIG. 2 a portion of an exhaust gas treatment system 12 illustrates an exemplary embodiment of the invention. The exhaust gas treatment system 12 includes an SCR device 28 that receives exhaust gas 10 from upstream portions of the system. The exhaust gas is preferably already thoroughly mixed with an ammonia reductant (not shown) and, as the exhaust gas 10 passes through the SCR device, components of NOx are reduced to non-regulated exhaust constituents. The exit 38, or downstream end of the SCR device 28, is configured without a typical exit cone and instead is configured to mate with the inlet 40 of a compact mixing plenum 42. Referring to FIGS. 3-5 and with continuing reference to FIG. 2, the compact mixing plenum 42 comprises a ridged canister 44 having a cross-section approximately the same as the cross-section "D" of the SCR device 28. Immediately downstream from the inlet 40 is a circumferentially configured exhaust gas consolidation chamber 46 which is closed by a bulkhead 48. A NOx sensor 49 may be disposed within the consolidation chamber and is mounted in a position such that most of the exhaust 10 exiting the SCR device 28 is monitored for NOx conversion efficiency of the upstream SCR device. Signals from the NOx sensor 49 are used by the controller 15 to determine the need to adjust the quantity of ammonia reductant being injected upstream of the SCR device 28. An exhaust gas opening 50 is disposed in the bulkhead 48 and operates as a conduit through which the exhaust gas 10, passing through the exhaust gas consolidation chamber 46, enters a higher pressure, higher velocity exhaust gas mixing conduit 52 that is in fluid and sealing communication therewith. Disposed adjacent to the entry of the higher pressure, higher velocity exhaust gas mixing conduit 52 may be an HC injector 20 (or Urea Injector should this device be upstream of an SCR device 28) mounted in an injector mounting flange 54. The HC injector 20 is configured to inject HC (or Fuel) into the exhaust gas 10 entering the exhaust gas consolidation chamber 46 upon signal direction from the controller 15 that the DPF device 14, for instance, may require regeneration; thereby requiring an increase in the temperature of the exhaust gas 10 (downstream of the OC device 18).

Consolidation of the exhaust gas 10 from the lower pressure, lower velocity exhaust gas consolidation chamber 46 into the higher pressure, higher velocity exhaust gas mixing conduit 52 will result in an increase in the flow velocity of the exhaust gas 10 as it passes therethrough. In exemplary embodiments illustrated in FIGS. 2, 3, and 5, 6 the fluid conduit 52 is configured in a "u-shape" such that the high velocity exhaust gas 10 passing through the conduit 52 will be forced to execute an approximately 180 degree change in flow direction (i.e. from a downstream to an upstream direction, for instance) which imparts turbulence to aid in mixing. As illustrated in FIG. 5, the exhaust gas mixing conduit exit 56 is spaced a distance "E" from the bulkhead 48 such that the exhaust gas/HC mixture may exit the higher pressure, higher velocity exhaust gas mixing conduit 52 into the larger exit volume 58 of the compact mixing plenum 42, in the manner of an expansion chamber, where its velocity slows and further mixing of the fluid and the exhaust gas 10 occurs. Distance "E" may be determined by performance metrics such as desired temperature distribution downstream of the OC device 18, and/or the total system pressure drop.

In the exemplary embodiment shown in FIG. 5, the exit or downstream end of the compact mixing plenum 42 may be configured without a typical exit cone and instead comprises an outlet end 60 that is configured to mate with an inlet end 62 of an OC device 18. The OC device 18, unlike typical devices described in the background, is constructed without an inlet cone and instead comprises the inlet end 62 which extends about the perimeter of its rigid canister 66 and has a cross-section approximately the same as the cross-section "D" (FIG. 3) of the compact mixing plenum 42. The inlet 62 is configured to fluidly and sealingly mate with the outlet 60 of the compact mixing plenum 42 to receive a uniform mix of exhaust gas and HC for oxidation over the oxidation catalyst therein. The oxidation of the HC within the oxidation catalyst device 18 raises the temperature of the exhaust gas 10 to a temperature sufficient to oxidize particulate matter within a downstream PF device 14 which will result in regeneration following delivery of the high temperature exhaust gas to the PF device.

Figure 6:
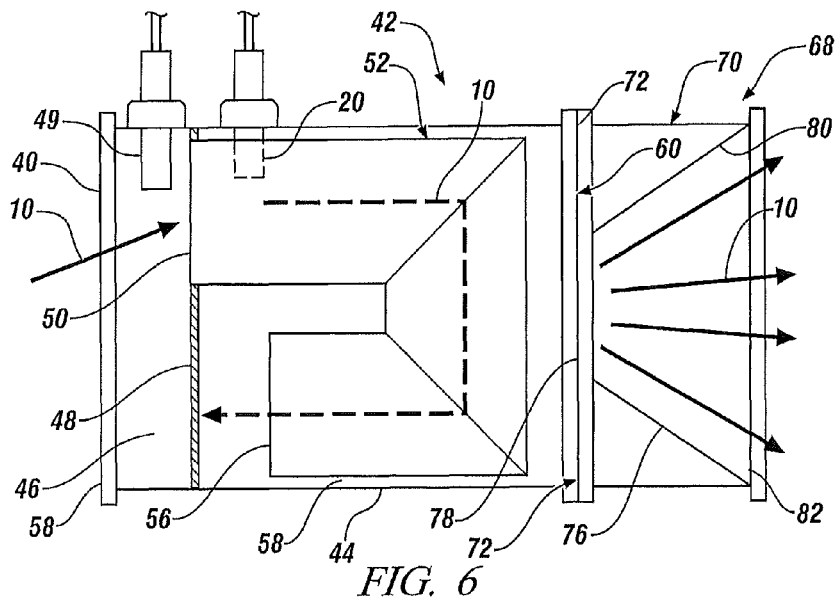
FIG. 6 is a schematic sectional view of another exemplary embodiment of the compact mixing plenum embodying features of the invention.

In an optional, exemplary embodiment of the invention shown in FIG. 6, a diffuser assembly 68 may be disposed between the exit 60 of the compact mixing plenum 42 and the inlet 62 of the oxidation catalyst device 18. The diffuser assembly comprises a rigid canister 70 having an inlet 72 and an outlet 82 both configured to fluidly and sealingly mate with the exit 60 of the compact mixing plenum 42 and the inlet 62 of the oxidation catalyst device 18 respectively. The diffuser assembly 68 comprises a cone assembly 76 having an inlet opening 78 and an outlet opening 80 that is configured to collect the exhaust gas 10 exiting the compact mixing plenum 42 and evenly defuse the exhaust gas/HC mixture over the face or inlet end of the oxidation catalyst device 18 to improve distribution of the exhaust gas and, thus, the oxidation of the HC as it passes over the oxidation catalyst on its way to the PF device 14 to regenerate the device through oxidation of trapped particulates therein.

In another exemplary embodiment of the diffuser assembly 68, illustrated in FIG. 3, a diffuser assembly 68A may be disposed between the exit 60 of the compact mixing plenum 42 and the inlet 62 of the oxidation catalyst device 18. The diffuser assembly comprises a rigid canister 70 having an inlet 72 and an outlet 82 both configured to fluidly and sealingly mate with the exit 60 of the compact mixing plenum 42 and the inlet 62 of the oxidation catalyst device 18 respectively. The diffuser assembly 68 comprises a cone assembly 76 having an outlet opening 80 that is configured to evenly defuse the exhaust gas/HC mixture towards the outer portion of the inlet end of the oxidation catalyst device 18 to improve distribution of the HC/exhaust gas mixture and, thus, the oxidation of the HC as it passes over the oxidation catalyst on its way to the PF device 14 to regenerate the device through oxidation of trapped particulates therein. In the embodiment illustrated, a limited quantity of exhaust gas 10 is allowed to pass around the cone assembly in order to assure that exhaust gas 10 is distributed about the outer perimeter of the oxidation catalyst device 18 assuring full utilization of the catalyst disposed thereon.

Figure 7:
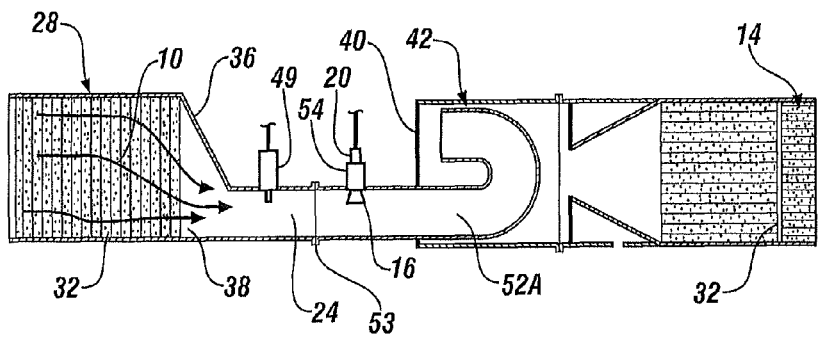
FIG. 7 is a schematic view of another embodiment of an automotive exhaust treatment system embodying features of the invention.
Figure 8:
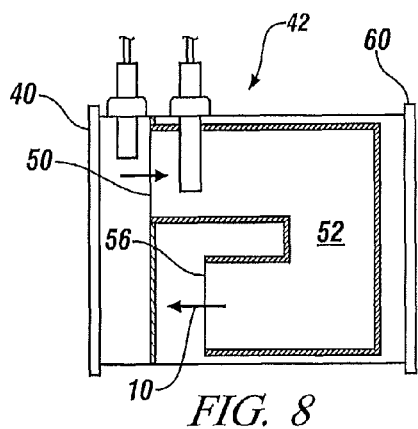
FIGS. 8-11 are schematic views of some alternative embodiments of the internal mixing conduits of the compact mixing plenum embodying features of the invention.
Figure 9:
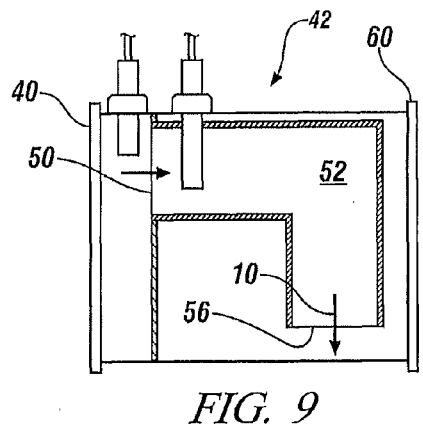
Figure 10:
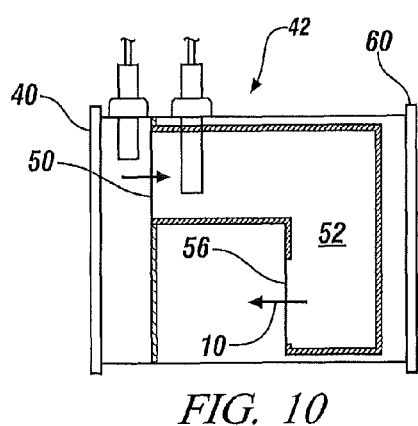
Figure 11:
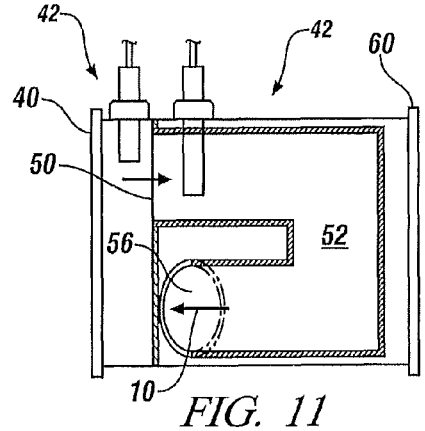

In yet another embodiment of the invention illustrated in FIG. 7, for packaging or other purposes, it may not be necessary to mount the exit of the SCR device 28 closely adjacent, to the inlet 40 of the compact mixing plenum 42. In such an instance, an exit cone 36 may collect the exhaust gas 10 exiting the SCR device 28 where it enters exhaust conduit 24 and is transported to a fluid connection 53 with exhaust gas mixing conduit 52A. In the embodiment illustrated, the mixing conduit 52A projects out of the inlet end 40 of the compact mixing plenum 42 to sealingly engage the exhaust conduit 24. Exhaust gas 10 enters the compact mixing plenum and is mixed in the same manner as described above. Unburned HC may be injected using an HC injector that is installed in an injector mounting flange 54, also as described above.

Referring to FIGS. 8-11, other exemplary embodiments are illustrated with various configurations for the exhaust gas mixing conduit 52. Each conduit may be selected based on exhaust gas flow parameters such as temperature, pressure drop or volume as well as the length permitted for adequate mixing of the injected fluid such as unburned HC 16 or a reductant such as urea.

Figure 12:
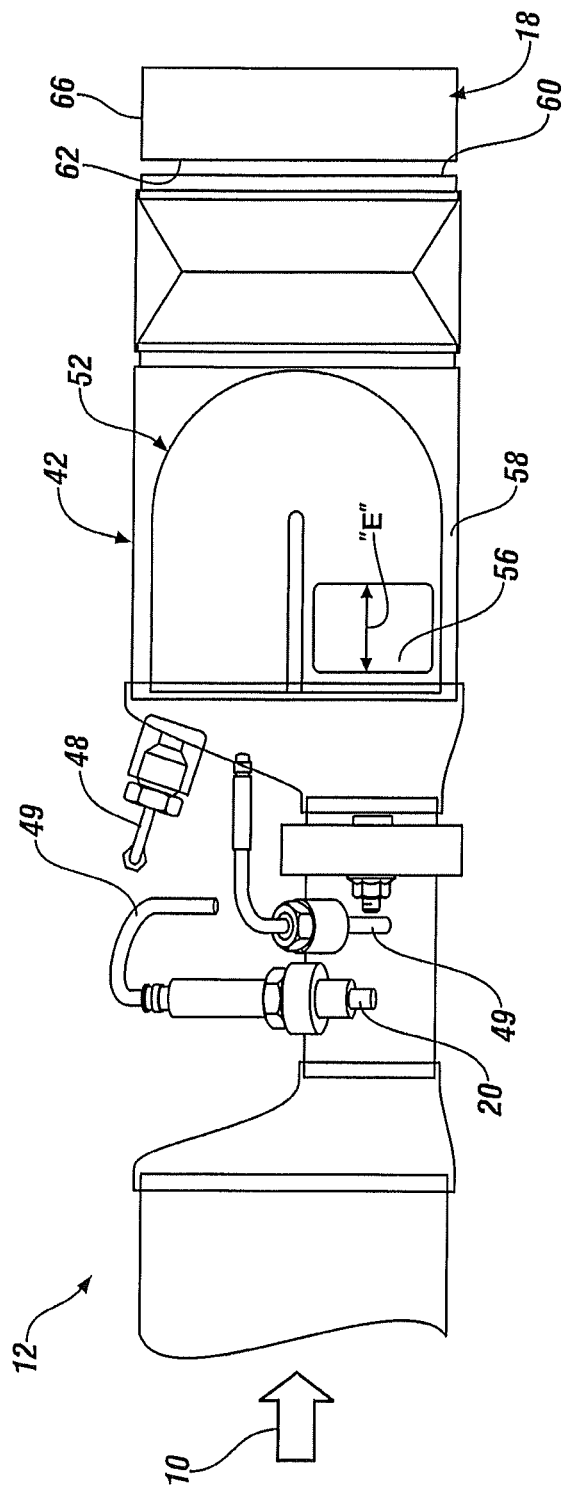
FIG. 12 is a schematic sectional view of another exemplary embodiment of the compact mixing plenum embodying features of the invention.

In an exemplary embodiment illustrated in FIG. 12, the fluid conduit 52 is configured in a "u-shape" such that the high velocity exhaust gas 10 passing through the conduit will be forced to execute an approximately 180 degree change in flow direction (i.e. from a downstream to an upstream direction) which imparts turbulence to aid in mixing. As illustrated, an exhaust gas mixing conduit exit 56 has an opening length "E" and is disposed adjacent to the bulkhead 48 such that the exhaust gas/HC mixture may exit the mixing conduit 52 into the larger exit volume 58 of the compact mixing plenum 42, in the manner of an expansion chamber, where its velocity slows and further mixing of the fluid and the exhaust gas 10 occurs. Opening length "E" may be determined by performance metrics such as desired temperature distribution downstream of the OC device 18, and/or the total system pressure drop. In the exemplary embodiment shown in FIG. 12, the exit or downstream end of the compact mixing plenum 42 may be configured without a typical exit cone and instead comprises an outlet end 60 that is configured to mate with an inlet end 62 of an OC device 18. The OC device 18 may be constructed without an inlet cone and instead comprises the inlet 62 which extends about the perimeter of its rigid canister 66 and has a cross-section approximately the same as the cross-section of the compact mixing plenum 42. The inlet 62 is configured to fluidly and sealingly mate with the outlet 60 of the compact mixing plenum 42 to receive a uniform mix of exhaust gas and HC for oxidation over the oxidation catalyst therein. The oxidation of the HC within the oxidation catalyst device 18 raises the temperature of the exhaust gas 10 to a temperature sufficient to oxidize particulate matter within a downstream PF device 14 which will result in regeneration following delivery of the high temperature exhaust gas to the PF device.

For certain aftertreatment systems, particularly diesel after treatment systems, certain fluids such as fuel ("HC") and ammonia ("Urea") need to be thoroughly mixed and vaporized before they can be distributed and efficiently utilized by the respective catalysts. This usually requires a defined distance and residence time in the exhaust treatment system 12 from the point of introduction to the catalyst in order for the system to operate efficiently. The goal of the invention is to propose a design that performs this function in a much shorter and more compact distance, therefore allowing greater flexibility for packaging the after treatment system 12 in the vehicle. While the above was focused primarily on the use of the compact mixing plenum 42 with an HC fluid for delivery to a downstream oxidation catalyst device 18, the very same oxidation mixing plenum 42 may just as easily be applied for use with other exhaust fluids such as an ammonia or urea reductant which must be adequately mixed upstream of a selective catalytic reduction device 28 without any deviation from the inventive scope.

In an exemplary embodiment this invention utilizes pipe bends, changes in flow area and volume to improve mixing and residence time of the injected vapor or liquid. Turbulence generated by area changes and flow direction combined with increased volume of the system (i.e. improved residence time) is effective in producing superior results (i.e. mixing and vaporization) over conventional systems with static mixers and longer mixing lengths with smaller diameter exhaust flow pipes. In addition actual exhaust flow distance can be realized over line-of-sight flow distance by packaging parts within other parts (i.e. compact mixing can 42).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system having a compact mixing plenum configured to receive an exhaust gas/fluid mixture comprising:
    a canister having an upstream inlet;
    a bulkhead disposed within said canister at a distance downstream of said upstream inlet to thereby define an exhaust gas consolidation chamber therebetween;
    an exhaust gas opening, disposed in said bulkhead, through which exhaust gas passing through said exhaust gas consolidation chamber enters a high pressure, high velocity mixing conduit, said mixing conduit comprising:
        a substantially U-shaped conduit configured to direct the fluid/exhaust gas mixture from a downstream to an upstream direction within the compact mixing plenum for through mixing of said fluid/exhaust gas mixture; and
        a high pressure, high velocity mixing conduit exit located adjacent a downstream side of the bulkhead, and
    a low pressure, low velocity exit volume defined by said rigid canister downstream of said bulkhead and configured to receive the fluid/exhaust gas mixture from said high pressure, high velocity mixing conduit exit for further mixing of said fluid/exhaust gas mixture wherein actual exhaust flow distance is realized over line-of-sight flow distance.

2. The exhaust gas treatment system of claim 1, wherein the exhaust gas pressure in said exhaust gas consolidation chamber is lower than the exhaust gas pressure in said high pressure, high velocity mixing conduit.

3. The exhaust gas treatment system of claim 1, wherein the exhaust gas pressure in said high pressure, high velocity mixing conduit is higher than the exhaust gas pressure in said low pressure, low velocity exit volume.

4. The exhaust gas treatment system of claim 1, further comprising a fluid injector disposed adjacent said exhaust gas opening and configured to inject a fluid into the exhaust gas to form said fluid/exhaust gas mixture.

5. The exhaust gas treatment system of claim 4, wherein the fluid injector is a hydrocarbon injector and the fluid is a liquid or gaseous hydrocarbon.

6. The exhaust gas treatment system of claim 4, wherein the fluid injector is a urea/ammonia reductant injector and the fluid is a liquid or gaseous ammonia reductant.

7. The exhaust gas treatment system of claim 1 further comprising an outlet in fluid communication with a downstream oxidation catalyst device for delivery of said fluid/exhaust gas mixture thereto.

8. The exhaust gas treatment system of claim 1, wherein a distance "E" of the high pressure, high velocity mixing conduit exit from the downstream side of the bulkhead is determined by performance metrics such as one or more of the desired temperature distribution downstream of the oxidation catalyst device and the total exhaust gas treatment system pressure drop.

9. The exhaust gas treatment system of claim 7, said compact mixing plenum outlet configured to mate with an inlet end of said oxidation catalyst device, wherein said oxidation catalyst device has a cross-section approximately the same as the cross-section of the compact mixing plenum and is configured to fluidly and sealingly mate with the exit end of the compact mixing plenum to receive a uniform mix of said fluid/exhaust gas mixture for oxidation over the oxidation catalyst therein.

10. The exhaust gas treatment system of claim 9, wherein the oxidation of the hydrocarbon within the oxidation catalyst device raises the temperature of the exhaust gas to a temperature sufficient to oxidize particulate matter within a downstream particulate filter device to regenerate said device.

11. The exhaust gas treatment system of claim 1, said upstream inlet configured to mate with an outlet end of an upstream selective catalyst reduction device, wherein said selective catalyst reduction device has a cross-section approximately the same as the cross-section of the compact mixing plenum and is configured to fluidly and sealingly mate with the upstream inlet of the compact mixing plenum to receive the gas mixture.

12. The exhaust gas treatment system of claim 1, further comprising an outlet in fluid communication with a downstream selective oxidation catalyst device for delivery of said fluid/exhaust gas mixture thereto.

13. The exhaust gas treatment system of claim 7, further comprising a diffuser assembly disposed between the outlet of the compact mixing plenum and the inlet of the oxidation catalyst device, the diffuser assembly comprising:
    a canister having an inlet configured to fluidly and sealingly mate with the outlet of the compact mixing plenum and an outlet configured to fluidly and sealingly mate with an inlet of the oxidation catalyst device; and
    a cone assembly having an inlet opening and an outlet opening that is configured to collect the fluid/exhaust gas mixture exiting the compact mixing plenum and to evenly defuse the fluid/exhaust gas mixture over the inlet of the oxidation catalyst device to improve distribution of the fluid/exhaust gas mixture and, thus, the oxidation of the HC as it passes over the oxidation catalyst.

14. The exhaust treatment system of claim 13, wherein a limited quantity of the fluid/exhaust gas mixture is allowed to pass around the cone assembly in order to assure that the fluid/exhaust gas mixture is distributed about an outer perimeter of the oxidation catalyst device.

* * * * *